(12) United States Patent
Lee

(10) Patent No.: US 7,539,784 B2
(45) Date of Patent: May 26, 2009

(54) HARD DISK TYPE DETECTING CIRCUIT AND HARD DISK CONNECTING PORT HAVING THE HARD DISK TYPE DETECTING CIRCUIT

(75) Inventor: Chung-Lun Lee, Taipei (TW)

(73) Assignee: Inventec Corporation, Taipei (TW)

( * ) Notice: Subject to any disclaimer, the term of this patent is extended or adjusted under 35 U.S.C. 154(b) by 185 days.

(21) Appl. No.: 11/704,491

(22) Filed: Feb. 8, 2007

(65) Prior Publication Data

US 2008/0195786 A1    Aug. 14, 2008

(51) Int. Cl.
*G06F 3/00* (2006.01)
(52) U.S. Cl. ...................................................... 710/16
(58) Field of Classification Search ............... 710/15, 710/16, 17, 18, 62–64, 74
See application file for complete search history.

(56) References Cited

U.S. PATENT DOCUMENTS

| 5,948,077 | A  | * | 9/1999  | Choi et al. ............ | 710/9   |
| 6,965,956 | B1 | * | 11/2005 | Herz et al. ............ | 710/74  |
| 7,009,827 | B1 | * | 3/2006  | Lee et al. ............. | 361/91.1|
| 7,024,539 | B2 | * | 4/2006  | Bresemann et al. ...... | 712/36  |
| 7,072,995 | B1 | * | 7/2006  | Burroughs ............. | 710/16  |
| 2007/0115954 | A1 | * | 5/2007 | Wu et al. ............. | 370/359 |
| 2008/0005621 | A1 | * | 1/2008 | Bedwani et al. ........ | 714/43  |
| 2008/0019357 | A1 | * | 1/2008 | Martinez et al. ....... | 370/368 |

OTHER PUBLICATIONS

Serial Attached SCSI General Overview, Rob Elliott, Sep. 30, 2003.*
Serial ATA, A Comparison With Ultra ATA Technology, <http://www.seagate.com/content/pdf/whitepaper/SerialATA_comparison_UATA_Technology.pdf >, accessed on Oct. 6, 2008.*

* cited by examiner

*Primary Examiner*—Khanh Dang
(74) *Attorney, Agent, or Firm*—Jianq Chyun IP Office

(57) ABSTRACT

The present invention provides a hard disk type detecting circuit for detecting a type of a hard disk plugged into a hard disk connecting port. The circuit includes a ground end, a power end for receiving a reference power source, and a voltage divider having a first resistor and a second resistor electrically connected to the first resistor via a signal output end. Two paths are formed in the signal output end, one path being used as a signal output end, the other electrically connecting with an idle pin of the hard disk connecting port. When a hard disk is plugged into the hard disk connecting port, the idle pin, depending on the type of the plugged hard disk, is or is not electrically connected to the hard disk. According to the connection result, the signal output end outputs an identifiable signal, indicating the type of the hard disk.

7 Claims, 3 Drawing Sheets

HARD DISK TYPE DETECTING CIRCUIT AND HARD DISK CONNECTING PORT HAVING THE HARD DISK TYPE DETECTING CIRCUIT

BACKGROUND OF THE INVENTION

1. Field of the Invention

The present invention relates generally to a hard disk type detecting technology, and more particularly, to a hard disk type detecting circuit and a hard disk connecting port having the hard disk type detecting circuit, the hard disk type detecting circuit detecting whether a hard disk plugged into the hard disk connecting port is a SAS hard disk or a SATA hard disk.

2. Description of Related Art

Generally, a hard disk is plugged into a hard disk connecting port for establishing electrical connection with a computer device. The hard disk connecting port is further electrically connected with an indicator such that the hard disk plugging state can be shown through the lighting state of the indicator. More particularly, through a status interface that can detect the hard disk status, which is the eleventh pin (referred as P11), the hard disk connecting port can control operation of the indicator by switching on the indicator when the output voltage of the pin P11 is low and switching off the indicator when the output voltage of the pin P11 is high. Thereby, a user can know whether the hard disk is correctly plugged into the hard disk connecting port or not.

The current commonly used SAS hard disk connecting port allows a SAS type hard disk to be plugged thereto. In addition, the SAS hard disk connecting port also allows a hard disk of different type such as a SATA type hard disk to be plugged thereto. At the time a SAS type hard disk is plugged into the SAS hard disk connecting port, output signal of the pin P11 changes from a high voltage level to a low voltage level so as to drive the indicator to operate, thereby indicating the hard disk has been plugged into the connecting port. But when a SATA hard disk is plugged into the SAS hard disk connecting port, the output signal of the pin P11 will stay at the high voltage level, which accordingly cannot switch on the indicator. Therefore, a user cannot identify whether the SATA hard disk is correctly plugged into the connecting port or not. In addition, even if no hard disk is plugged into the hard disk connecting port, the output voltage of the pin P11 stays at the high voltage level, which is same as when the SATA hard disk is plugged into the hard disk connecting port. As a result, the computer device cannot correctly identify whether a SATA hard disk has been plugged into the hard disk connecting port only by the output signal of the pin P11. Therefore, the computer device cannot correctly identify the type of the hard disk plugged into the hard disk connecting port only through the voltage level of output signal of the pin P11.

Therefore, there is a need to develop a hard disk type detecting circuit for overcoming the above drawbacks.

SUMMARY OF THE INVENTION

According to the above drawbacks, an objective of the present invention is to provide a hard disk type detecting circuit and a hard disk connecting port having the hard disk type detecting circuit, for detecting whether a hard disk plugged into the hard disk connecting port is a SAS hard disk or a SATA hard, thereby facilitating operation of users.

Another objective of the present invention is to provide a hard disk type detecting circuit and a hard disk connecting port having the hard disk type detecting circuit, capable of indicating a plugging state of a hard disk.

A further objective of the present invention is to provide a hard disk type detecting circuit and a hard disk connecting port having the hard disk type detecting circuit, the hard disk type detecting circuit supporting the common use of the hard disk connecting port on the SAS hard disk and the SATA hard disk.

In order to attain the above and other objectives, the present invention provides a hard disk type detecting circuit for detecting type of a hard disk plugged into a hard disk connecting port. The hard disk type detecting circuit comprises: a ground end; a power end for receiving a reference power source; and a voltage divider comprising a first resistor and a second resistor, wherein one end of the first resistor is electrically connected to the power end and the other end of the first resistor is electrically connected with one end of the second resistor while the other end of the second resistor is electrically connected to the ground end, two paths are formed in the electrical connection point of the first and the second resistors, one path is used as a signal output end while the other path is electrically connected with an idle pin of the hard disk connecting port, when either a first type hard disk or a second type hard disk is plugged into the hard disk connecting port, the idle pin of the hard disk connecting port, depending on the type of the hard disk, forms an electrical or non-electrical connection with the hard disk, according to the connection result, the voltage divider allows the signal output end to output an identifiable signal of the type of the hard disk plugged into the connecting port.

The hard disk type detecting circuit of the present invention determines the type of the hard disk mainly through the idle pin of the hard disk connecting port and the output signal of the voltage divider. In a preferred embodiment, the first type hard disk is a SATA hard disk, the hard disk connecting port is a SAS hard disk connecting port, and the second type hard disk is a SAS hard disk.

Compared with the prior art, the hard disk type detecting circuit of the present invention can correctly identify the type of the hard disk plugged into the hard disk connecting port as a first type or a second type, thereby facilitating operation of the users. In addition, the common use of the hard disk connecting port on multi-type hard disks can be implemented.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification. The present invention can also be performed or applied by other different embodiments. The details of the specification may be on the basis of different points and applications, and numerous modifications and variations can be made without departing from the spirit of the present invention.

The hard disk type detecting circuit of the present invention is used to detect the type of a hard disk plugged into a hard disk connecting port of a computer device, wherein the hard disk can be a first type or a second type. In the present embodiment, the first type is different from the type of the hard disk connecting port, while the second type is same as the type of the hard disk connecting port. More particularly, the first type is a SATA type, while both the type of the hard disk connecting port and the second type are a SAS type.

Figure 1:
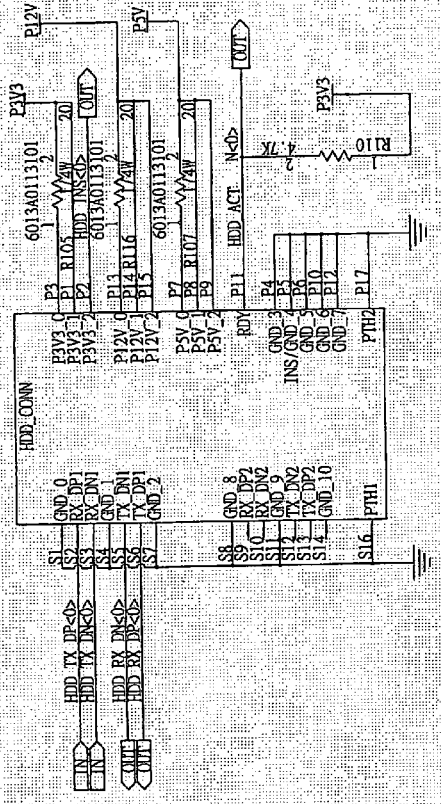
FIG. 1 is a construction diagram of a SAS hard disk connecting port.

FIG. 1 is a construction diagram of a general SAS hard disk connecting port. The SAS hard disk connecting port differs from a SATA hard disk connecting port in that the SAS hard disk connecting port has eighth to fourteenth pins S8 to S14, but the SATA hard disk does not. Based on this difference, a hard disk type detecting circuit of the present invention is built and adopts the fourteenth pin S14 as a detecting source. However, it is not limited thereto. Any of the pins from S8 to S13 can be used as the detecting source.

Figure 2:
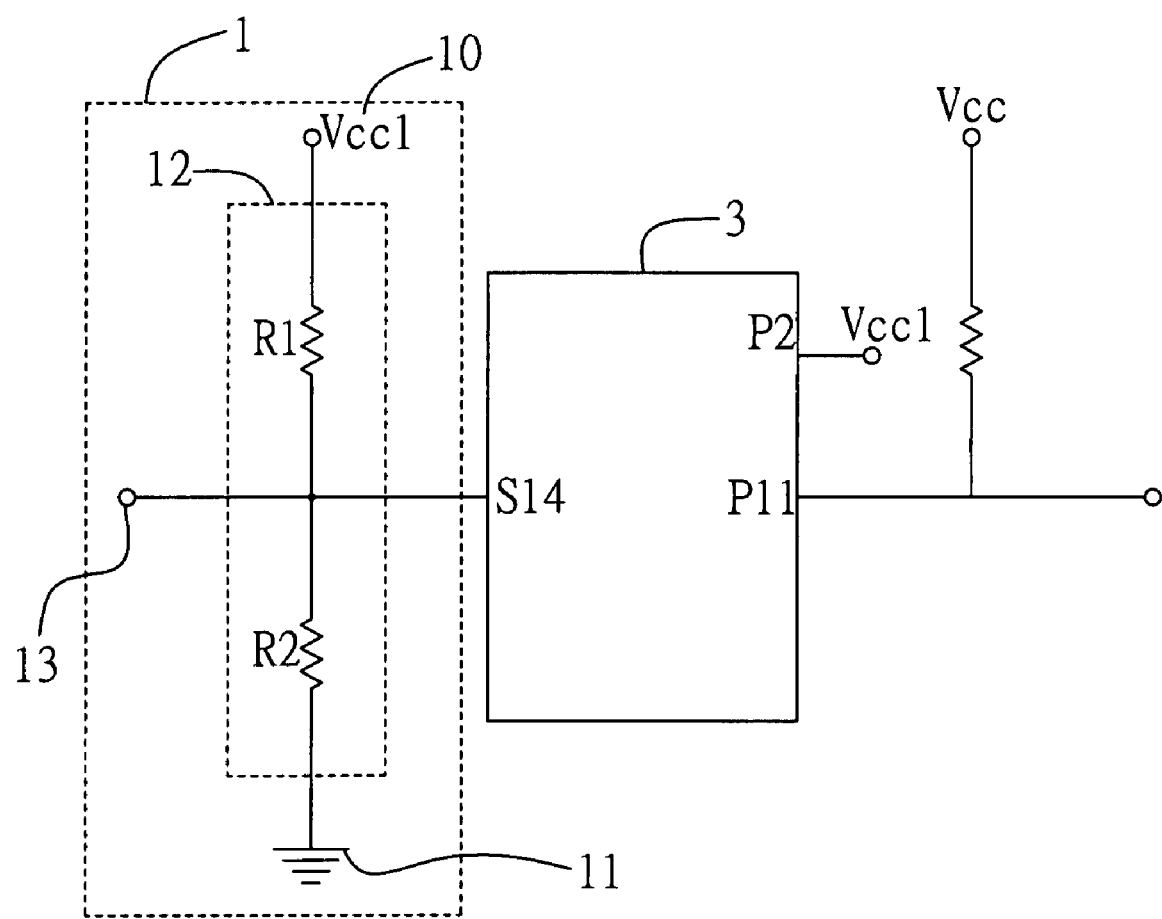
FIG. 2 is a diagram showing electrical connection between the hard disk type detecting circuit according to the present invention and a SAS hard disk connecting port.

FIG. 2 is a circuit diagram of a hard disk type detecting circuit 1 electrically connected with a SAS hard disk connecting port 3 according to the present invention. The hard disk type detecting circuit 1 comprises a power end 10, a ground end 11, a voltage divider 12, and a signal output end 13.

The power end 10 is electrically connected with a pin P2 of the SAS hard disk connecting port 3. Therefore, if the pin P2 is electrically connected to an idle power source of 3.3V, the power end 10 receives a 3.3V power signal.

The voltage divider 12 comprises a first resistor R1 and a second R2 connected in series with the first resistor R1. One end of the first resistor R1 is electrically connected to the power end 10, and the other end of the first resistor R1 is electrically connected with one end of the second resistor R2. The other end of the second resistor R2 is electrically connected to the ground end 11.

The signal output end 13 is connected to the pin S14 of the SAS hard disk connecting port 3, allowing a user to identify whether the hard disk plugged into the SAS hard disk connecting port 3 is a SAS hard disk or a SATA hard disk.

Figure 3A:
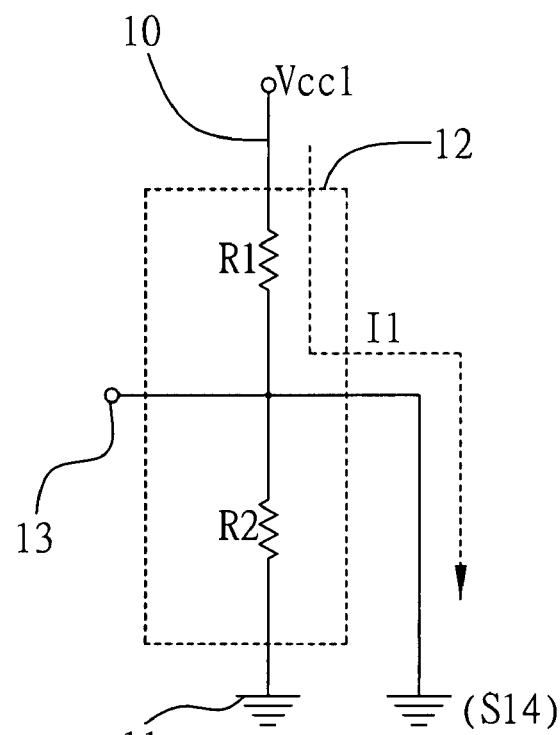
FIG. 3(A) is a diagram showing a circuit relation formed between the SAS hard disk connecting port and the hard disk type detecting circuit.

For example, if a SAS hard disk is plugged into the SAS hard disk connecting port 3, the pin S14 of the SAS hard disk connecting port 3 is electrically connected to one of a plurality of pins the SAS hard disk, thereby forming an equivalent circuit shown in FIG. 3(A), in which a first current I1 flowing through the first resistor R1 flows to the pin S14 a ground, rather to the second resistor R2. As a result, a voltage level on the signal output end 13 is "0".

Figure 3B:
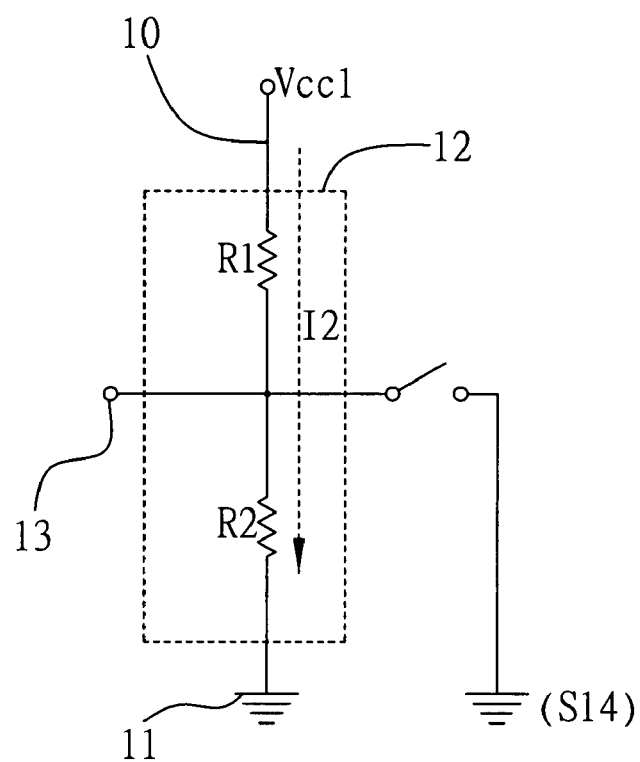
FIG. 3(B) is a diagram showing another circuit relation formed between the SAS hard disk connecting port and the hard disk type detecting circuit.

On the contrary, if a SATA hard disk is plugged into the SAS hard disk connecting port 3, the pin S14 of the SAS hard disk connecting port 3 is electrically connected to none of a plurality of pins of the SATA hard disk, thereby forming another equivalent circuit shown in FIG. 3(B), in which a second current I2 flowing through the first resistor R1 does not flow to the pin S14, but to the second resistor R2 instead. As a result, a voltage level on the signal output end 13 is "1".

To further clarify the working mode of the hard disk type detecting circuit 1 of the present invention, a concrete example is provided, wherein the first resistor R1 has a resistance of 20KΩ, the second resistor R2 has a resistance of 1MΩ, and the power end 10 receives a 3.3V power signal. Refer to FIGS. 3(A) and 3(B). If the pin S14 of the SAS hard disk connecting port 3 is electrically connected to none of the pins of an unknown hard disk, the second current I2, as shown in FIG. 3(B), flows from the first resistor R1 to the second resistor R2, and a voltage level on the signal output end 13 of the voltage divider 12 is equal to 3.3V×(1MΩ/(1MΩ+20KΩ))=3.2V, a high voltage level signal (logic high signal "1"). According to such the high voltage level signal, a computer device can know the unknown hard disk plugged into the SAS hard disk connecting port 3 is a SATA hard disk. On the other hand, if the pin S14 of the SAS hard disk connecting port 3 is electrically connected to one of the pins of an unknown hard disk, the first current I1, as shown in FIG. 3(A), flows from the first resistor R1 to the ground, and a voltage level on the signal output end 13 of the voltage divider 12 is equal to 3.3V×(0Ω/(0Ω+20KΩ))=0V, a low voltage level signal (logic low signal "0"). According to such the low voltage level signal, the computer device can know the unknown hard disk plugged into the SAS hard disk connecting port 3 is a SAS hard disk.

Therefore, the type of the hard disk plugged into the SAS hard disk connecting port 3 can be known through the signal outputted from the signal output end 13. However, if the hard disk is not plugged into the SAS hard disk connecting port 3, as the power end 10 has no input of power signal 3.3V, the signal output end 13 also has a low voltage level signal (logic low signal "0"). At this time, the computer device should detect signal of the pin P11 of the SAS hard disk connecting port 3. If the pin P11 has a high voltage level signal (logic high signal "1"), it means that the SAS hard disk connecting port 3 is connected with a hard disk and the hard disk is a SAS type hard disk, otherwise, if the computer device detects the pin P11 has a low voltage level signal (logic low signal "0"), it means that the SAS hard disk connecting port 3 is not connected with a hard disk.

The above mechanism can be realized by further electrically connecting a NOR gate to the voltage divider 12. In detail, the NOR gate has a first input end electrically connected to the signal output end 13, a second input end electrically connected to the pin P11, and an output end. If the SATA hard disk is plugged into the SAS hard disk connecting port 3, the signal output end 13 outputs the logic high signal "1"; If the SAS hard disk is plugged into the SAS hard disk connecting port 3, the signal output end 13 outputs the logic low signal "0"; If no hard disk is plugged into the SAS hard disk connecting port 3, the signal output end 13 still outputs the logic low signal "0", but the output end of the NOR gate outputs the logic high signal "1", because the pin P11 outputs the logic low signal "0".

Thus, according to information of the pin P11 of the SAS hard disk connecting port 3 and the signal outputted by the signal output end 13, the computer device can determine whether the SAS hard disk connecting port is connected with a hard disk and determine the hard disk is of a SAS type or a SATA type, and further show the determining result to users by controlling a display unit such as a LED. Therein, the control on the display unit can be realized through a CPLD (Complex Programmable Logic Device).

Therefore, a computer device having the hard disk type detecting circuit can correctly identify the hard disk plugged into the hard disk connecting port is of a SAS type or a SATA type, thereby facilitating users' operation. Meanwhile, the detected result can be shown to users through a display unit. Thereby, the common use of the hard disk connecting port on both the SAS type hard disk and the SATA type hard disk can be implemented.

The above-described descriptions of the detailed embodiments are only to illustrate the preferred implementation according to the present invention, and it is not to limit the scope of the present invention, Accordingly, all modifications and variations completed by those with ordinary skill in the art should fall within the scope of present invention defined by the appended claims.

What is claimed is:

1. A hard disk type detecting circuit for detecting a type of a hard disk plugged into a hard disk connecting port, wherein the hard disk type comprises a first type and a second type, the hard disk type detecting circuit at least comprising:
   a ground end;
   a power end for receiving reference power source; and
   a voltage divider comprising a first resistor and a second resistor, wherein one end of the first resistor is electrically connected to the power end and the other end of the first resistor is electrically connected with one end of the second resistor while the other end of the second resistor is electrically connected to the ground end, two paths are formed in the electrical connection point of the first and the second resistors, one path is used as a signal output end while the other path is electrically connected with an idle pin of the hard disk connecting port, when the hard disk is the first type hard disk, the idle pin of the hard disk connecting port has no electrical connection with the hard disk, accordingly the voltage divider allows the signal output end to output a high voltage level signal, when the hard disk is the second type hard disk, the idle pin of the hard disk connecting port forms an electrical connection with the hard disk, accordingly the voltage divider allows the signal output end to output a low voltage level signal, wherein the first type hard disk and the hard disk connecting port are of different types while the second type hard disk and the hard disk connecting port are of a same type, the first type hard disk is a SATA hard disk, the hard disk connecting port is a SAS hard disk connecting port, and the second type hard disk is a SAS hard disk.

2. The hard disk type detecting circuit of claim 1, wherein the idle pin of the hard disk connecting port refers to any one of the eighth to fourteenth pins of the SAS hard disk connecting port.

3. The hard disk type detecting circuit of claim 1, wherein the power end is electrically connected with the second pin of the SAS hard disk connecting port, the second pin providing an idle power source of 3.3V.

4. The hard disk type detecting circuit of claim 1, wherein when the signal output end outputs a low voltage level signal, the voltage level of the eleventh pin of the SAS hard disk connecting port is detected, if the voltage level of the eleventh pin is high, it means that the SAS hard disk connecting port is connected with the SAS hard disk, otherwise, if the voltage level of the eleventh pin is low, it means that the SAS hard disk connecting port is not connected with the hard disk.

5. A hard disk connecting port having a hard disk type detecting circuit, the hard disk type detecting circuit detecting a type of a hard disk plugged into the hard disk connecting port, the hard disk connecting port comprising:
   a SAS hard disk connecting port; and
   the hard disk type detecting circuit, which comprises:
      a ground end;
      a power end for receiving a reference power source;
      a first resistor having one end electrically connected to the power end;
      a second resistor having one end electrically connected to the other end of the first resistor and the other end electrically connected to the gronnd end; and
      a signal output end electrically connected to the other end of the first resistor, the one end of the second resistor, and one selected from the group consisting of eighth to fourteenth pins of the SAS hard disk connecting port, wherein when the hard disk is a SATA hard disk, the one selected from the group consisting of eighth to fourteenth pins of the SAS hard disk connecting port has no electrical connection with the hard disk, accordingly a voltage divider allows the signal output end to output a high voltage level signal, when the hard disk is a SAS hard disk, the one selected from the group consisting of eighth to fourteenth pins of the SAS hard disk connecting port forms an electrical connection with the hard disk, accordingly the voltage divider allows the signal output end to output a low voltage level signal.

6. The hard disk connecting port of claim 5, wherein the power end is electrically connected with a second pin of the SAS hard disk connecting port.

7. The hard disk connecting port of claim 5 further comprising a NOR gate having a first input end electrically connected to the signal output end, a second input end electrically connected to an eleventh pin of the SAS hard disk connecting port, and an output end.

* * * * *